US000001885H

United States Statutory Invention Registration [19]

[11] Reg. Number: H1,885

[45] Published: *Oct. 3, 2000

Pruett et al.

[54] APPARATUS AND METHOD FOR CONTROLLING THE OPERATIONAL STATE OF AN ECHO CANCELLER

[75] Inventors: James D. Pruett, Oakland; James M. Davis, Germantown, both of Tenn.

[73] Assignee: DSC/Celcore, Inc., Plano, Tex.

[ * ] Notice: This patent is subject to a terminal disclaimer.

[21] Appl. No.: 09/026,504

[22] Filed: Feb. 19, 1998

Related U.S. Application Data

[63] Continuation-in-part of application No. 08/678,254, Jul. 11, 1996, Pat. No. 5,835,486.

[60] Provisional application No. 60/060,107, Sep. 26, 1997.

[51] Int. Cl.[7] ..... H04M 1/00

[52] U.S. Cl. ..... 379/406

*Primary Examiner*—Daniel T. Pihulic

*Attorney, Agent, or Firm*—John E. Flaim

[57] ABSTRACT

An apparatus for processing wireless telecommunications is provided. The apparatus includes an echo canceller module. An echo canceller module controller is connected to the echo canceller module. The echo canceller module controller can receive echo canceller data, and can turn the echo canceller module on when the echo canceller data indicates that echo cancellation is required, such that echo cancellation may be controllably turned on only when it is needed.

25 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS AND METHOD FOR CONTROLLING THE OPERATIONAL STATE OF AN ECHO CANCELLER

CLAIM OF PRIORITY

The instant patent application is a continuation in part of U.S. patent application No. 08/678,254, filed Jul. 11, 1996 now U.S. Pat. No. 5,835,486 "Multi-Channel Transcoder Rate Adapter Having Low Delay and Integral Echo Cancellation," James M. Davis and James D. Pruett, inventors, filed Jul. 11, 1996, and claims priority from U.S. provisional patent application No. 60/060,107, "Cellular Communication System," Anthony G. Fletcher and Scott D. Hoffpauir, inventors, filed Sep. 26, 1997.

RELATED PATENT APPLICATIONS

The instant patent application is directly related to the following patent applications: (a) Ser. No. 09/026,505 "Agent Interworking Protocol and Translation/Router for a Wireless Telecommunications System," DSC Case No. 830-00, atty. docket No. 24194000.176, naming Scott D. Hoffpauir, Steve B. Liao, and Kelvin Kinsey as inventors; (b) Ser. No. 09/025,870 "Integrated Telecommunications Switch," DSC Case No. 834-00, atty. docket No. 24194000.180, naming Anthony G. Fletcher and Scott D. Hoffpauir as inventors; (c) Ser. No. 09/026,319 "System and Method for Transferring Echo Cancellation Data," DSC case No. 842-00, atty. docket No. 24194000.187, naming Jenny W. Erwin and James D. Pruett as inventors, each of which are commonly owned and assigned with the present application and which are filed contemporaneously with this application; and (d) Ser. No. 08/678,254, now U.S. Pat. No. 5,835,486 "Multi-Channel Transcoder Rate Adapter Having Low Delay and Integral Echo Cancellation," James M. Davis and James D. Pruett, inventors, filed Jul. 11, 1996, which is commonly owned and assigned with the present application.

FIELD OF THE INVENTION

The present invention relates generally to telecommunications systems, and more particularly to an apparatus and method for controlling the operational state of an echo canceller.

BACKGROUND

Telecommunications systems are used to provide telecommunications services between two or more user interfaces. User interfaces may include telephone handsets, facsimile machines, computers and other equipment, and may be connected to the switching system by fixed land-based conductors or wireless services. Telecommunications services are provided by establishing a telecommunications channel between two user interfaces, such that encoded analog or digital data may be transmitted between the user interfaces until a state of completion is reached.

An undesired characteristic of telecommunications channels is the generation of echo. Echo may be inadvertently created, and is usually a function of the physical parameters of a telecommunications channel. For example, when a telecommunications channel includes a two wire conductor in series with a four wire conductor, echo may be generated at the interface between the two wire conductor and the four wire conductor. Other sources of echo are also known. Echo is one of the primary factors affecting the perceived quality of voice connections. Echo canceller devices are routinely used to prevent echo from degrading telecommunications channels.

Although echo cancellation is a useful technique in processing telecommunications, echo cancellation is not always required. If an echo canceller is enabled on a given telecommunications channel when echo cancellation is not required, the resulting signal may have degraded quality such that voice data is unintelligible. Moreover, enabling an echo canceller typically consumes resources that may be better utilized to carry out other functions rather than unneeded echo cancellation. Accordingly, it is highly desirable to not enable, or disable if already enabled, echo cancellation with respect to a telecommunications channel that does not require echo cancellation, such as when a call is directed to a radio based subscriber unit, such as a hand held mobile telephone.

One method of simulating the activation of an echo canceller is to increase the rate of attack of an echo canceller upon detection of off-hook signaling. This method has the drawback of requiring the echo canceller to remain active, even though echo cancellation is not performed. Thus, increasing the rate of attack of echo cancellation upon detection of off-hook signaling may still result in allocation of system resources to perform echo cancellation when not required. Increasing the rate of attack of echo cancellation to simulate turning the echo canceller on may also result in additional processing delay if the echo canceller is located in an external bank and the signal is routed to the echo canceller regardless of the rate of attack of echo cancellation.

SUMMARY OF THE INVENTION

Therefore, a need has arisen for a system and method for processing wireless communications that reduces or eliminates the degraded telecommunications quality and unwanted noise generation that can accompany the use of an echo canceller when echo cancellation is not required.

In accordance with the present invention, a system and method for processing wireless communications are provided that substantially eliminate or reduce disadvantages and problems associated with previously developed systems and methods for processing wireless communications.

One aspect of the present invention is a system for processing wireless telecommunications. The system includes an echo canceller module. An echo canceller module controller is connected to the echo canceller module. The echo canceller module controller can receive echo canceller module control data, and can turn the echo canceller module on when the echo canceller module control data indicates that echo cancellation is required.

Another aspect of the present invention is method for processing telecommunications. The method includes receiving an incoming telecommunications channel and signaling data at a telecommunications switch. It is then determined from the signaling data whether the incoming telecommunications channel requires echo cancellation. If the incoming telecommunications channel requires echo cancellation, the echo canceller is turned on.

Another aspect of the present invention is a method for controlling an echo canceller. The method includes initiating an outgoing telecommunications channel at a telecommunications switch. It is then determined whether the outgoing telecommunications channel is going to a land-based terminal. An echo canceller module is turned on if the destination of the outgoing telecommunications channel is a land-based terminal.

Yet another aspect of the present invention is a method for processing roaming telecommunications channels. The method includes receiving roam data for a telecommunications channel at a telecommunications switch. Echo cancellation processing for the telecommunications channel is then transferred to an anchor echo cancellation module. Echo cancellation processing for the telecommunications channel is then performed with the anchor echo cancellation unit until a state of call completion is reached.

The present invention provides many important technical advantages. One important technical advantage of the present invention is a system for processing wireless communications that allows an echo canceller to be turned on only when the echo canceller is needed. The system for processing wireless communications of the present invention thus eliminates the degraded telecommunications quality that can occur when echo cancellation is performed on circuits that do not have an echo signal present, such as clipping of the signal.

Another important technical advantage of the present invention is a method for processing wireless communications that allows echo cancellers to be controllably allocated to telecommunications channels. The method of the present invention provides for control of echo canceller functionality such that echo cancellation may be turned off when not needed, or may be turned on independently of the origination and destination of the telecommunications channel.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE DRAWINGS

Figure 1:
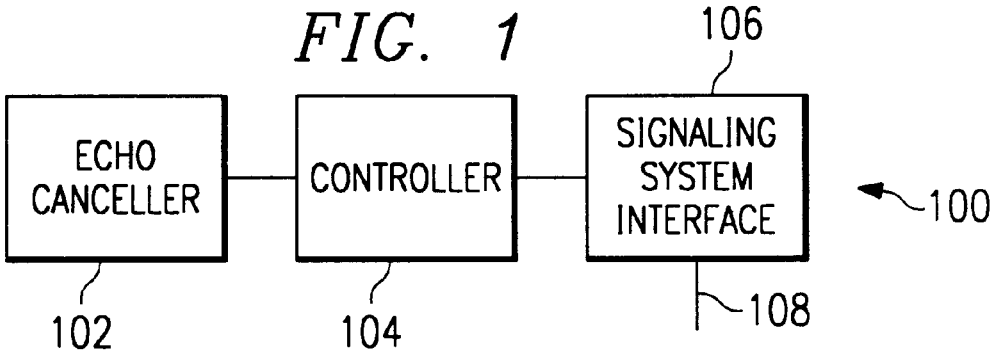
FIG. 1 is a block diagram of an echo canceller system in accordance with one embodiment of the present invention.

FIG. 1 is a block diagram of an echo canceller system 100 in accordance with one embodiment of the present invention. Echo canceller system 100 includes an echo canceller element 102, a controller element 104, a signaling system interface element 106, and a signaling system input 108. Echo canceller system 100 may be used to perform echo cancellation in a mobile telecommunications switch, a central office telecommunications switch, a transmission telecommunications switch, a switch hybrid network interface, or in a stand-alone echo cancellation unit that is used at a suitable location in a telecommunications network.

Echo canceller element 102 is operable to perform echo cancellation for a telecommunications channel. Echo canceller element 102 may be implemented in software, hardware, or a suitable combination of software and hardware. For example, echo canceller element 102 may be implemented by programming a digital signal processing circuit to perform a suitable echo cancellation algorithm. An example of a suitable echo canceller element is provided by U.S. patent application No. 08/678,254, now U.S. Pat. No. 5,835,486, entitled "Multi-Channel Transcoder Rate Adapter Having Low Delay and Integral Echo Cancellation," naming James M. Davis and James D. Pruett as inventors, filed Jul. 11, 1996, which is hereby incorporated by reference for all purposes.

Controller element 104 may be implemented in software, hardware, or a suitable combination of software and hardware. Controller element 104 is coupled to echo canceller element 102 by a suitable connection, including by way of example and not by limitation a logical connection, a data conductor, a signaling conductor, and a fiber-optic conductor. For example, if echo canceller element 102 and controller element 104 are each implemented in software on the same hardware platform, then the connection between echo canceller element 102 and controller element 104 may be implemented by a logical connection between the two software systems.

Controller element 104 is operable to turn the echo canceller element 102 on and off. For example, the echo canceller element may have a default state of inactive, and may be activated when needed. One advantage of this configuration is that if the echo canceller is a software system operating on a multi-purpose hardware platform such as a digital signal processing circuit, then the hardware resources may be allocated for other purposes besides echo cancellation when the echo canceller is turned off.

Signaling system interface element 106 may be implemented in hardware, software, or a suitable combination of hardware and software. Signaling system interface element 106 is coupled to controller element 104 by a suitable connection, including by way of example and not by limitation a logical connection, a data conductor, a signaling conductor, and a fiber-optic conductor. For example, if controller element 104 and signaling system interface element 106 are each implemented in software on the same hardware platform, then the connection between controller element 104 and signaling system interface element 106 may be implemented by a logical connection between the two software systems.

Signaling system interface element 106 is operable to receive signaling system data in a suitable format, such as R2 signaling data or Integrated Services Digital Network User Part signaling data, and to determine whether a hybrid interface or other source of echo is present. Echo may be introduced at a hybrid interface when the signal transfers from a four-wire connection to a two-wire connection. For example, if the echo canceller system 100 is implemented in a wireless telecommunications system switch, then signaling data indicative of a land terminal answer may be sufficient to indicate whether a hybrid interface is present, if the wireless telecommunications system switch interfaces with wireless subscriber units in a manner that does not require a four-wire to two-wire conversion.

Signaling system input 108 is coupled to signaling system interface element 106 by a suitable connection, including by way of example and not by limitation a logical connection, a data conductor, a signaling conductor, and a fiber-optic conductor. For example, signaling system input 108 may be signaling data that is received at a software system that operates on the same platform as signaling system interface element 106. In that configuration, the connection between signaling system interface element 106 and signaling system input 108 may be implemented by a logical connection.

Signaling system input 108 is a data channel that includes signaling data from a suitable source, such as R2 signaling data or Integrated Services Digital Network User Part signaling data. This signaling data is used by controller element 104 to determine whether a hybrid connection or other source of echo is present on a telecommunications channel.

In operation, signaling data received from signaling system input 108 at signaling system interface 106 is used by controller 104 to determine whether a source of echo may be present in a predetermined telecommunications channel, such as a hybrid interface between a two-wire system and a four-wire system. If the signaling data is indicative of a source of echo, then controller 104 causes echo canceller 102 to become operable for the predetermined telecommunications channel. In this manner, echo canceller 102 is normally non-operative and is only activated when necessary.

Figure 2:
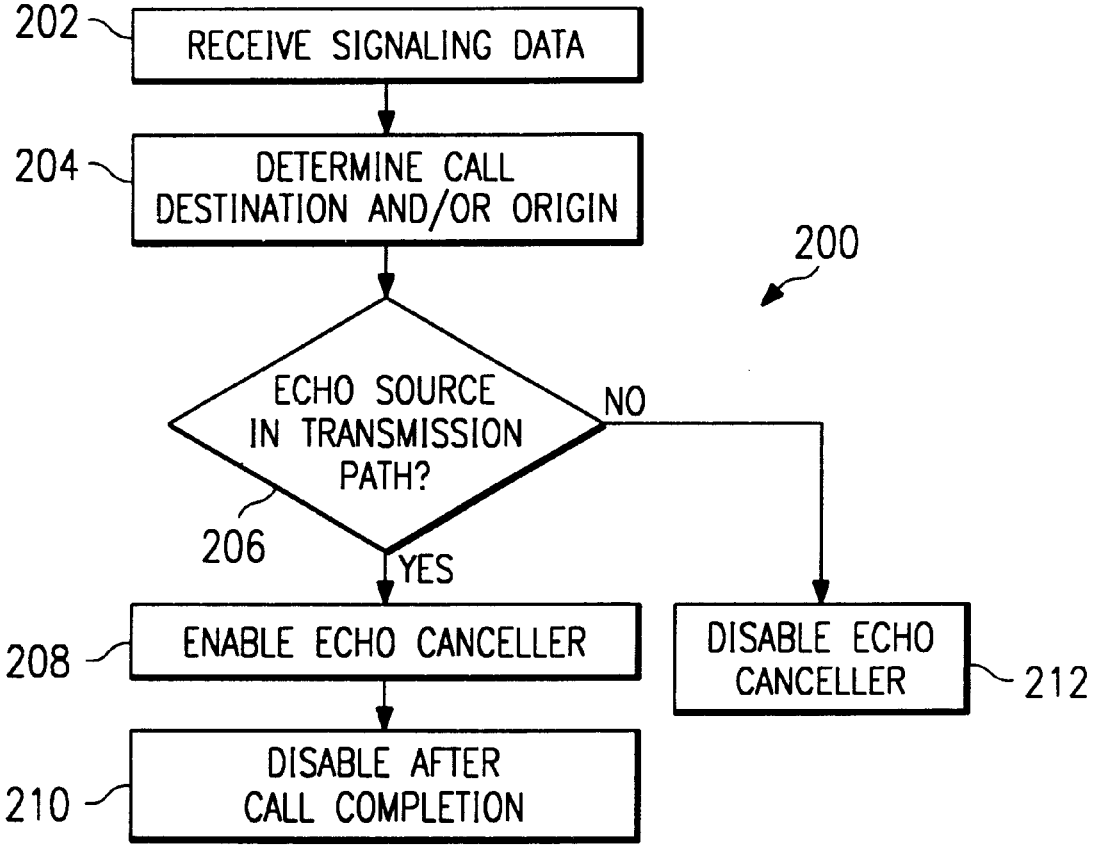
FIG. 2 is a flow chart of a method for controlling an echo canceller in accordance with one embodiment of the present invention.

FIG. 2 is a flow chart of a method 200 for controlling an echo canceller in accordance with one embodiment of the present invention. Method 200 may be implemented by echo canceller system 100 or other suitable systems that include echo cancellation capability for telecommunications channels.

Method 200 begins at step 202, where signaling data is received. For example, the signaling data may be received at a signaling system interface 106, or at another suitable component or element of a system with echo cancellation capability. The method then proceeds to step 204, where the call destination and/or origination data is determined. For example, a controller 104 may determine from the signaling data that a land terminal answer has occurred, such as by detecting an off-hook signal or by another suitable procedure. The method then proceeds to step 206.

At step 206, it is determined from the signaling data whether a source of echo is present. For example, if a transmission hybrid is present in the transmission path, then a two-wire to four-wire interface may also be present. The two-wire to four-wire interface is one exemplary source of echo that may be determined from signaling data. If a source of echo is determined to be present from the signaling data, then the method proceeds to step 208.

At step 208, an echo canceller is enabled. For example, the echo canceller may be an echo canceller element 102, and echo canceller enablement may include performing echo cancellation signal processing on a telecommunications channel with an echo cancellation algorithm that is incorporated as a software system on a digital signal processor circuit. The method then proceeds to step 210, where the echo canceller is disabled after the call reaches a state of completion. This step returns the system to its original state, thus ensuring that signal processing resources are made available for other purposes when echo cancellation is not required.

If no source of echo is determined to be present at step 206, the method proceeds to step 212. At step 212, the telecommunications channel is processed without echo cancellation, such that the echo canceller is disabled. For example, the echo canceller element 102 may be disabled by not performing echo signal processing on the telecommunications channel with a digital signal processor circuit. In this manner, no additional steps are required to disable echo cancellation processing, which decreases the requirements on processor resources and increases overall telecommunications channel handling efficiency. Other suitable procedures may also be used, such as decreasing the rate of attack of an echo cancellation circuit.

Figure 3:
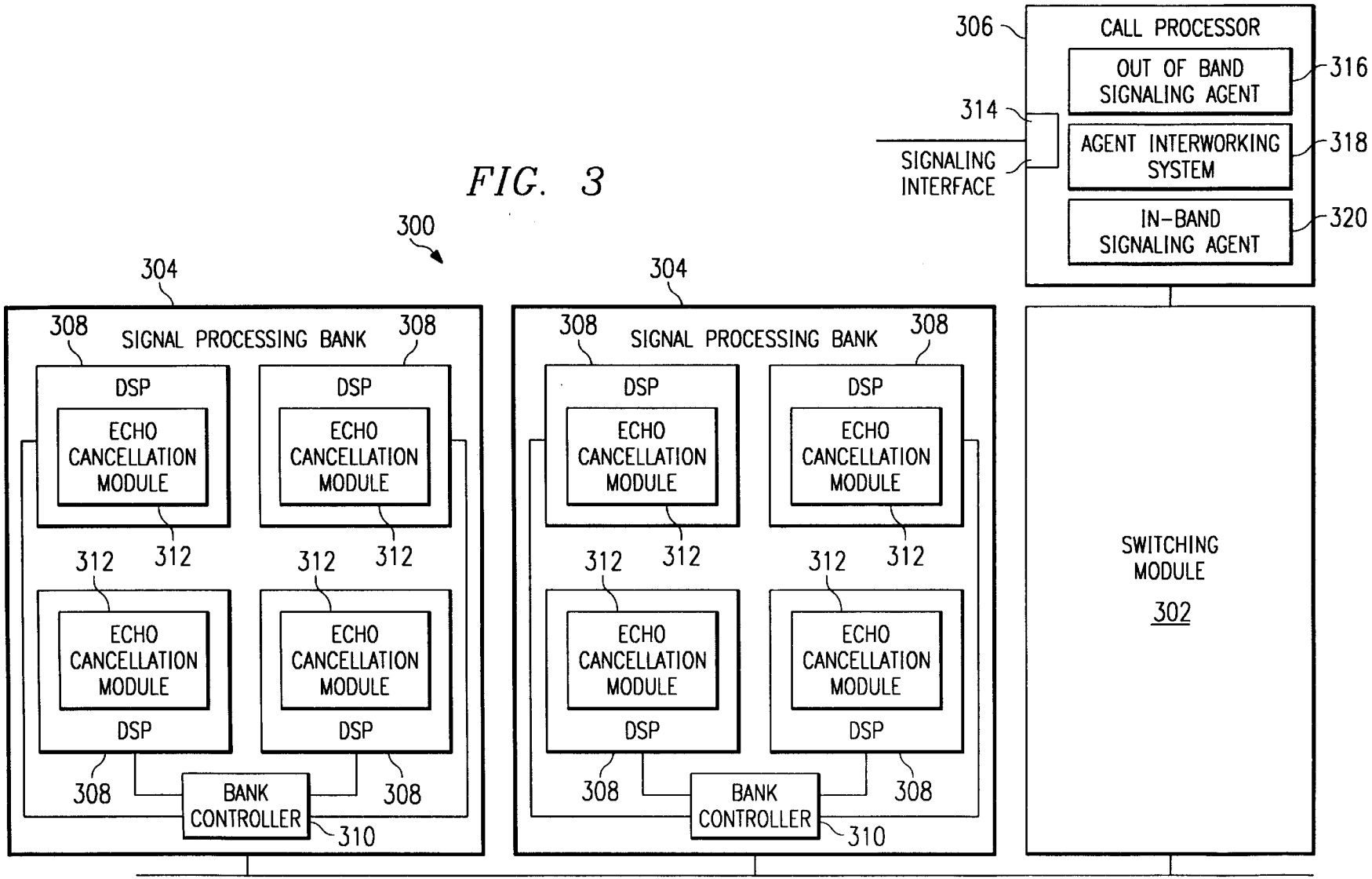
FIG. 3 is a block diagram of an echo canceller control system in accordance with one embodiment of the present invention.

FIG. 3 is a block diagram of an echo canceller control system 300 in accordance with one embodiment of the present invention. The echo canceller control system 300 may be used to control the echo canceller modules in a telecommunications switch system. The echo canceller control system 300 includes a switching module 302, two signal processing banks 304, and a call processor system 306. The signal processing banks 304 are coupled to the switching module 302, which is used to transmit data to and receive data from the call processor system 306.

Each signal processing bank 304 includes four digital signal processor circuits 308 and a bank controller 310. The digital signal processor circuits 308 comprise suitable data processing equipment, such as a Super Harvard Architecture Computer (SHARC) digital signal processor circuit. The digital signal processor circuits 308 include an echo canceller module 312 that is operable to perform echo cancellation data processing on telecommunications data. Echo canceller module 312 may be implemented in software, hardware, or a suitable combination of software and hardware.

The bank controller 310 comprises suitable data processing equipment, such as a Intel 80186 processor, and is coupled to each digital signal processor 308. The bank controller 308 is operable to transfer data between the digital signal processors 308, and to transfer data from the digital signal processors 308 to other bank controllers 310, or to the switching module 302.

The call processor system 306 includes signaling interface modules 314. Each signaling interface module 314 is operable to receive control and signaling data from an external source, such as the switched network. Each signaling interface module 314 may receive data in an SS7 standard format, or may receive data in other suitable formats. Call processor system 306 also includes an out-of-band signaling agent 316, an agent interworking system 318, and an in-band signaling agent 320. The out-of-band signaling agent 316, agent interworking system 318, and in-band signaling agent 320 are used to transfer control data from call processor system 306 to bank controller 310. For example, the out-of-band signaling agent 316 and in-band signaling agent 320 may be implemented in object-oriented programming language in a suitable architecture, such as a Common Object Request Broker Architecture, and may include an echo cancellation feature that is used to activate the echo cancellation module 312 when it is set to "on" by the call processor system 306.

The echo canceller module controller is formed by the hardware and software components of call processor system 306, switching module 302, and bank controller 310. For example, bank controller 310 is operable to turn the echo cancellation module 312 on from an off-state and off from an on-state in response to control data received from switching module 302. Bank controller 310 may also transfer echo cancellation algorithm data from an echo cancellation module 312 to another echo cancellation module 312 controlled by bank controller 310. Likewise, switching module 302 is operable to generate control data to cause two bank controllers 310 to transfer a telecommunications channel, echo cancellation parameter data, or other suitable functions from an echo cancellation module 312 controlled by a bank controller 310 to another echo cancellation module 312 controlled by another bank controller 310. Call processor system 306 is operable to process signaling data so as to determine whether a source of echo may be present on a telecommunications channel, and to generate control data that is transferred by switching module 302 to bank controller 310 so that the echo cancellation module 312 may be activated for that telecommunications channel.

In operation, each echo canceller module 312 is assigned to a telecommunications channel by bank controller 310, switching module 302, and/or call processor system 306. The echo canceller module 312 may be turned off by the echo canceller module controller if echo cancellation is not required for the telecommunications channel. In addition, the echo canceller module controller may allocate the echo canceller module to a telecommunications channel that is servicing a subscriber unit that has roamed out of the area serviced by the telecommunications switch, such that the echo canceller module 312 functions as an anchor echo canceller module.

Figure 4A:
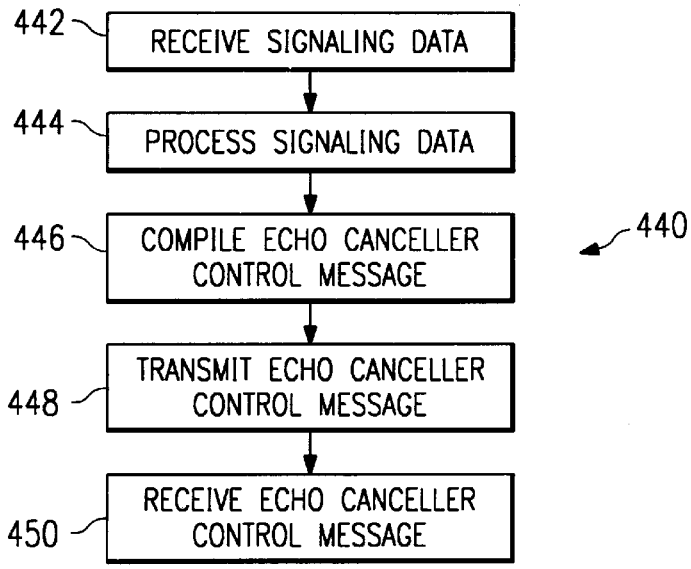
FIG. 4*a* is a flow chart of a data transfer method in accordance with the embodiment of the present invention.

FIG. 4*a* is a flow chart of a data transfer method 440 in accordance with one embodiment of the present invention. Data transfer method 440 may be used to transfer data from a signaling system interface to an echo canceller controller.

Method 440 begins at step 442, where signaling data is received at a signaling interface. The signaling data may include information that may be used to determine whether echo may be present in the telecommunications channel associated with the signaling data. The method then proceeds to step 444, where the signaling data is processed to determine whether echo cancellation is required.

At step 446, an echo canceller control message is compiled, such as if it is determined at step 444 that the signaling data indicates that echo cancellation is required. The method then proceeds to step 448, where an echo canceller control message is transmitted to an echo canceller controller or another suitable destination. At step 450, the echo canceller control message is received at an echo canceller controller or other suitable destination. The echo canceller control message may include control data to cause the state of an echo canceller to be changed from "off" to "on," to cause the state of an echo canceller to be changed from "on" to "off," to increase the rate of attack of an echo canceller, to decrease the rate of attack of an echo canceller, or to change the state of an echo canceller from any suitable first state to any suitable second state.

Figure 4B:
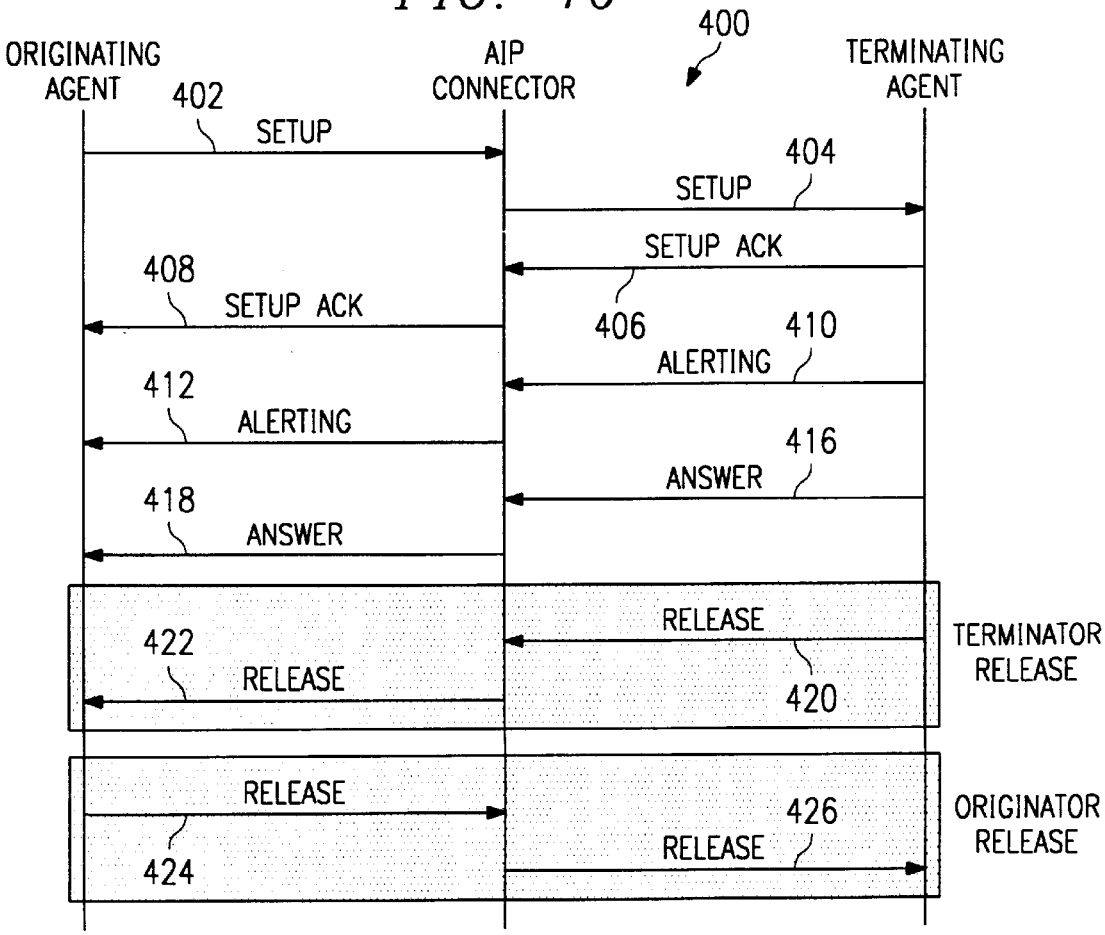
FIG. 4*b* is a flow chart of an agent interworking method in accordance with one embodiment of the present invention.

FIG. 4*b* is a flow chart of an agent interworking method 400 in accordance with one embodiment of the present invention. Agent interworking method 400 is used to transfer data, such as call party data, in the form of messages between two agents. The two agents and the agent interworking method 400 may be implemented in hardware, software, or a suitable combination of hardware and software.

For example, the agents and agent interworking method 400 may be implemented in components of a telecommunications system, such that any agent operating on one or more component of the telecommunications system may interface with any other agent operating on one or more component of the telecommunications system through the agent interworking method 400 operating on one or more components of the telecommunications system. Agent interworking method 400 may be used to transfer echo canceller control data from a signaling interface to an echo canceller controller. The agent interworking method 400 may be implemented in object-oriented programming language in a suitable architecture, such as a Common Object Request Broker Architecture.

Agent interworking method 400 begins at step 402, where a setup message is transmitted from an originating agent to the agent interworking protocol connector. The setup message is used to initiate dialog between two call processing agents, such as an R2 trunk agent and a mobile service agent.

The contents of the setup message may include calling number data, called number data, route data, call data record data, connection agent data, trunk group data, cell identification data, call forward data, original called number data, calling party category data, satellite data, continuity data, echo control data, signaling system data, transmission medium data, called party address data, calling party address data, original called party address data, redirecting party address data, call forwarding history data, and other suitable data. The agent interworking protocol connector is configured to receive the setup message and to transfer it to the terminating agent at step 404.

At step 406, the terminating agent transmits a setup acknowledge message to the agent interworking protocol connector. The setup acknowledge message is used to acknowledge receipt of the setup message by the terminating agent, and to provide additional information to the originating agent about the terminating agent. The contents of the setup acknowledge message may include agent type data, ringback data, trunk group identification data, route identification data, call setup data, problem data, and other suitable data. The agent interworking protocol connector transfers the setup acknowledge message to the originating agent at step 408.

At step 410, an alerting message is transmitted from the terminating agent to the agent interworking protocol connector. The alerting message is used to transmit status data to a call originator when a called number is ringing. The contents of the alerting message may include agent data, equipment identification data, trunk group identification data, route data, call setup data, problem data, call forwarding data, and other suitable data. The alerting message is transmitted to the originating agent from the agent interworking protocol connector at step 412.

At step 416, an answer message is transmitted from the terminating agent to the agent interworking protocol connector. The answer message includes data that is generated when the called party answers the call and establishes a telecommunications channel. The contents of the answer message may include trunk group data, agent data, setup data, and other suitable data The answer message is transmitted to the originating agent from the agent interworking protocol connector at step 418.

At step 420, a release message is transmitted from the terminating agent to the agent interworking protocol connector. The release message is sent when the calling party or the called party ends the call. The contents of the release message may include cause data (indicating why the call was terminated), metering data, location data, and other suitable data. The release message is transmitted to the originating agent from the agent interworking protocol connector at step 422. If the release message is generated by the calling party, it is transmitted to the agent interworking protocol at step 424 and to the terminating agent at step 426.

In operation, the agent interworking method 400 provides a method for transmitting data from an originating agent to a terminating agent without the need for unique interfaces between agents. In this manner, agents may be added or deleted without affecting system operation. In addition, the agent interworking protocol system provides a virtual communications channel between components on which the originating and terminating agent are operating.

For example, the agent interworking protocol system may receive an R2 signaling agent or an integrated services digital network user part agent from a call processing system and may transfer echo canceller data from the R2 signaling agent or an integrated services digital network user part agent to an echo canceller module controller. The R2 signaling agent or integrated services digital network user part agent may contain call party data, such as data that indicates whether the echo canceller module should be switched on. In this manner, signaling data or other data that indicates the existence of an echo signal on a telecommunications channel may be transferred to an echo canceller module controller from a call processor by an agent interworking protocol.

An example of an agent interworking protocol that may be used to provide the functionality of the agent interworking protocol controller is provided by the patent application entitled "Agent Interworking Protocol and Translation/Router for a Wireless Telecommunications System," DSC Case No. 830-00, atty. docket No. 24194000.176, commonly owned and assigned with the present application, which is filed contemporaneously with this application and is hereby incorporated by reference for all purposes.

Figure 5:
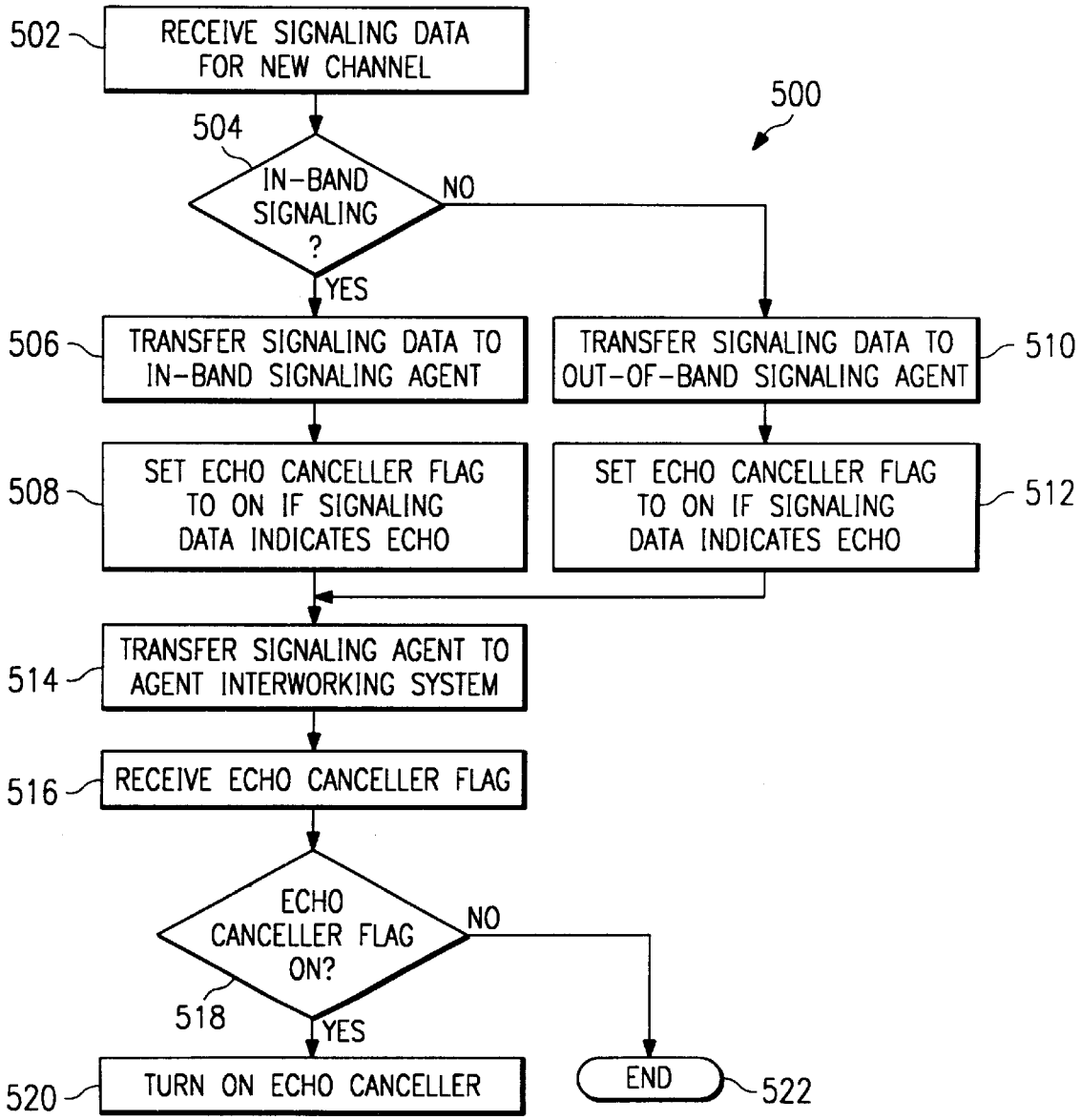
FIG. 5 is a flow chart of a method for controlling an echo canceller module in accordance with one embodiment of the present invention.

FIG. 5 is a flow chart of a method 500 for controlling an echo canceller module in accordance with one embodiment of the present invention. Method 500 may be used by a telecommunications system to control the operation of an echo canceller module so as to provide echo cancellation only when required, and to prevent the application of echo cancellation to a signal that does not contain any echo.

Method 500 begins at step 502, where signaling data is received for a telecommunications channel, such as by a call processor. The signaling data may be outgoing signaling data that has been collected from a subscriber unit or incoming signaling data received from a trunk. Outgoing signaling data may be collected at a suitable telecommunications switch system which determines whether the signaling data is signaling data for an outgoing telecommunications channel. If a complete set of outgoing digits are received, the signaling data is then transferred to the call processor. Incoming signaling data may be received in a suitable format, such as an R2 signaling format or an Integrated Services Digital Network User Part signaling format, and is typically complete as received.

At step 504, it is determined by a call processor system or other suitable system whether in-band signaling is required for the trunk, such as R2 signaling. If in-band signaling is used, the method proceeds to step 506, where the signaling data is transferred to an in-band signaling agent, such as by generating an R2 agent with the call processor system. Call setup procedures are then used. When call setup has reached a suitable stage, echo indication data such as call origination data or call destination data may be extracted or derived from the signaling data and stored in predetermined data fields of the in-band signaling agent.

For example, call setup for an outgoing call may require sending the outgoing signaling information to the switched network and receiving response signaling data that includes echo indication data. Echo indication data may be determined by comparing call destination or origination data to predetermined values stored in a data table of the telecommunications switch. Alternatively, echo indication data may be determined by analyzing the signal or other suitable methods. For example, the signaling data may indicate that the call has been routed from a four wire conductor to a two wire conductor, that the calling party is calling from a land-based telephone handset (land party data), or the telecommunications system call processing system may determine that other sources of echo are present. The signaling data may also be compared to a table of predetermined data values that indicate whether an echo signal may be present on the telecommunications channel. For example, predetermined R2 or Integrated Services Digital Network User Part signaling data may be associated with mobile calls, while other signaling data may be associated with land-based calls, such as an off-hook signal. This tabular data may be used to indicate the possible presence of an echo signal.

At step 508, the echo canceller flag is set to "on" if an echo signal is present or if the channel includes physical features that indicate the possible presence of an echo signal. If mobile party data or other data is received that indicates that echo cancellation is not required, then echo canceller flag is not turned on at step 508. The method then proceeds to step 514.

If it is determined at step 504 that in-band signaling is not being used, then out-of-band signaling must be used, and the method proceeds to step 510 from step 504. At step 510, the signaling data is transferred to an out-of-band signaling agent, and the method proceeds to step 512. At step 512, the echo canceller flag is set to "on" if the channel includes echo features. For example, the signaling data may indicate that the call is routed from a four wire conductor to a two wire conductor, or the telecommunications system call processing system may determine that other sources of echo are present. The signaling agent is then modified so that the echo canceller flag, which may be normally off, is turned on. The method then proceeds to step 514.

At step 514, the signaling agent is transferred to the agent interface. For example the telecommunications system may utilize an agent interworking method such as that shown in FIG. 4. The agent interface is configured to receive predetermined data in a predetermined format from the signaling agent, and to transfer predetermined data to various components, such as the echo canceller module controller. The method then proceeds to step 516.

At step 516, the echo canceller flag data is received at the echo canceller module controller from the agent interface. The method then proceeds to step 518, where it is determined whether the echo canceller flag indicates that the echo canceller module should be turned on. If the echo canceller flag indicates that the echo canceller module should be turned on, the method proceeds to step 520, and the echo canceller module is enabled, such as by performing echo signal cancellation processing with a digital signal processor circuit. Otherwise, the method proceeds to step 522 and terminates. After termination, processing of the call proceeds without echo cancellation.

Figure 6:
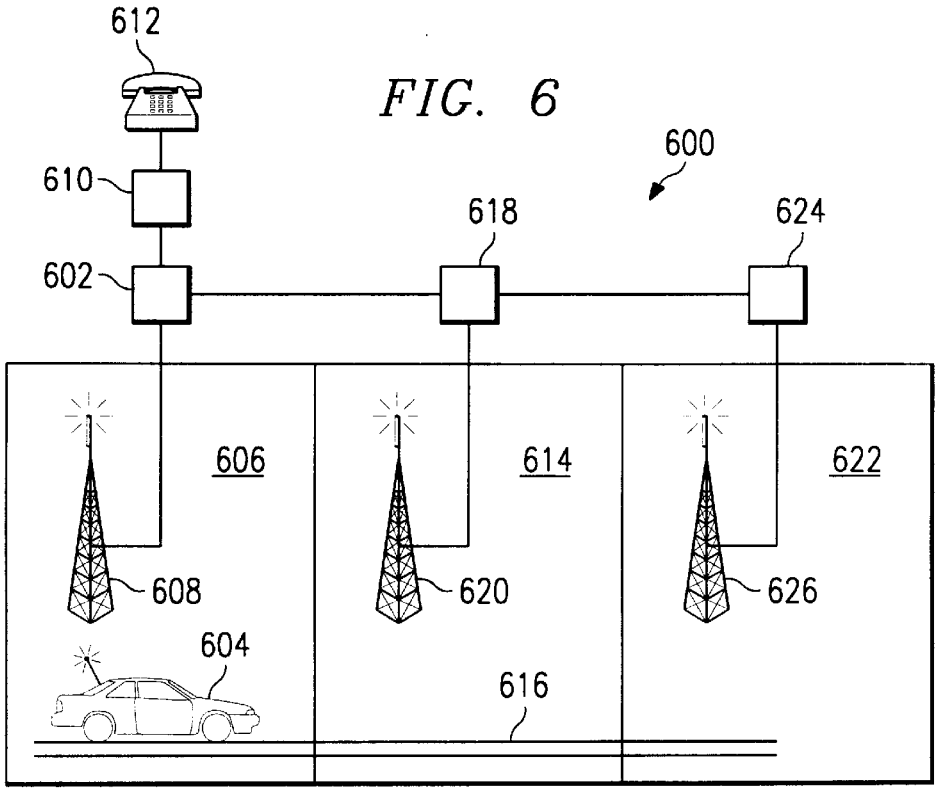
FIG. 6 is a block diagram of an echo canceller system in accordance with one embodiment of the present invention.

FIG. 6 is a block diagram of an echo canceller system 600 in accordance with one embodiment of the present invention. Echo canceller system 600 may be used to provide echo cancellation to mobile callers that roam out of the cell in which the call is initiated.

Echo canceller system 600 includes telecommunications switch 602 and mobile subscriber 604. Mobile subscriber 604 initiates a call through telecommunications switch 602 in service cell 606, which is served by base transceiver station 608. Mobile subscriber 604 is connected through telecommunications switch 610 to land-based handset unit 612. The system having components 602 through 612 may be implemented as a system that is compatible with the Groupe Speciale Mobile standard for a Global System for Mobile Communications (GSM), such as that described in the patent application entitled "Integrated Telecommunications Switch," Ser. No. 09/025,870, naming Anthony G. Fletcher and Scott D. Hoffpauir as inventors, commonly owned and assigned with the present application, filed contemporaneously with this application, and which is hereby incorporated by reference for all purposes.

Because the call is placed from a mobile unit to a land based unit echo cancellation may be required, such as if the call is transferred from a four-wire conductor to a two-wire conductor. As the mobile subscriber 604 travels from cell 606 to cell 614 along highway 616, the telecommunications channel initiated by mobile subscriber 604 is transferred from telecommunications switch 602 to telecommunications switch 618 when the mobile subscriber enters the service range of base transceiver station 620. After the telecommunications channel has been handed off, though, it is still necessary to provide echo cancellation for the telecommunications channel. This echo cancellation may be provided by the echo canceller module of the telecommunications switch 602.

Likewise, as the mobile subscriber leaves cell 614 and enters cell 622, the telecommunications channel initiated by mobile subscriber 604 is transferred from telecommunications switch 618 to telecommunications switch 624 when the mobile subscriber enters the service range of base transceiver station 626. The echo cancellation requirements for the telecommunications channel may still be provided by the echo canceller module of telecommunications switch 602.

In operation, a mobile subscriber initiates a telephone call while in a first cell. The call is serviced by a first telecommunications switch. As the mobile subscriber enters a second cell, the call is transferred through a second telecommunications switch. The first switch is able to continue performing echo cancellation using the functionality of signal processing module 48 and switching module 42. As the caller passes to more cells, the call is progressively routed through the additional switches, and echo cancellation is still provided by the "anchor" echo canceller module of telecommunications switch 602.

Figure 7:
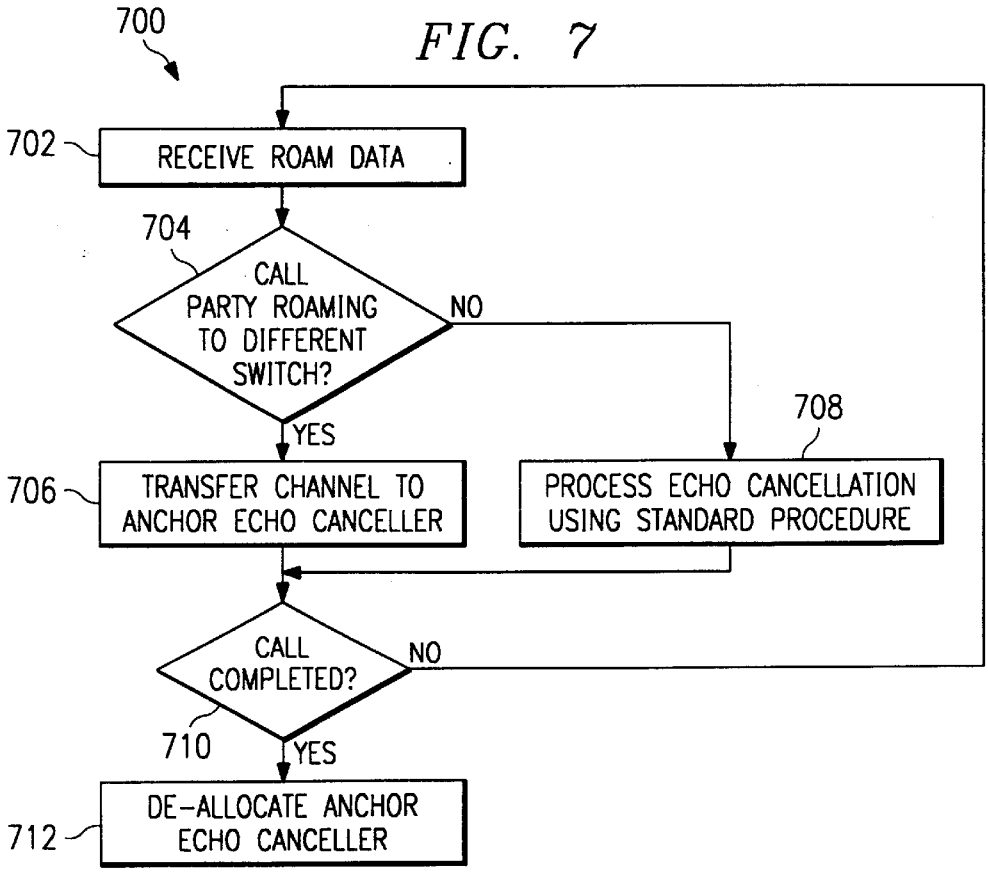
FIG. 7 is a flow chart of a method for providing echo cancellation in accordance with one embodiment of the present invention.

FIG. 7 is a flow chart of a method 700 for providing echo cancellation in accordance with one embodiment of the present invention. Method 700 may be used to control echo canceller module operation when a mobile subscriber roams out of the service area of the telecommunications switch that initiated the telephone call.

Method 700 begins at step 702, where roam data is received at a telecommunications switch. The roam data may include signal strength data from base transceiver stations serviced by the telecommunications switch, and signal strength data from base transceiver stations service by another telecommunications switch that provides switching services for callers in adjacent cells. At step 704, it is determined whether a call party, such as the called party or the calling party, is roaming from a cell serviced by a first telecommunications switch to a cell services by a second telecommunications switch. If such roaming occurs, the method proceeds to step 706.

At step 706, the echo canceller processing for the telecommunications channel is transferred to an anchor echo canceller module. An anchor echo canceller module is used to provide echo cancellation for telecommunications channels that include terminals that have roamed outside of the service area of the switch providing the echo cancellation service. The anchor echo canceller module is used to provide uninterrupted echo cancellation. The anchor echo cancellation processor may also be one echo cancellation module in a bank of one or more anchor echo cancellation modules. Alternatively, the status of the echo cancellation module that was used to perform echo cancellation for the telecommunications channel when the subscriber unit was in a service cell serviced by the telecommunications switch may be changed. This status indicator may be used to indicate that the echo cancellation module is being used for anchor echo cancellation, so that the call processor does not assign that echo cancellation module to a new telecommunications channel until after the present telecommunications channel has reached a state of completion. The method then proceeds to step 710.

If the call party is not roaming to a different switch, the method proceeds to step 708 where echo cancellation is provided using the standard echo cancellation procedure for the switch. The method then proceeds to step 710, where it is determined whether the call has completed. If the call has not completed, then the method returns to step 702 and the call is monitored for additional roaming activity. Otherwise, the method proceeds to step 712, where the anchor echo canceller module is de-allocated if it has been previously allocated at step 706.

In operation, a mobile subscriber is either called or places a call from a telecommunications system that requires echo cancellation. If the caller roams to a different cell, method 700 is used to assign an anchor echo canceller module to the call. This anchor echo canceller module may be the echo canceller module that was originally designated for the call, if a bank of internal echo canceller modules is provided by the of the telecommunications system. Alternatively, the echo canceller modules may be a predetermined echo canceller module that is used to provide echo cancellation services. Method 700 also allows a caller to roam back to the originating telecommunications system after roaming away from the switch, and supports the allocation of the roaming call to an anchor echo canceller module, to one of a bank of echo canceller modules, or to an echo canceller module associated with local subscriber service.

The present invention provides many important technical advantages. Turning on an echo canceller only when it is needed eliminates problems with non-linearity in processing, such as clipping, which may occur when echo cancellation is performed on a signal that has no echo component. Turning on an echo canceller only when it is needed also provides benefits for external echo cancellers, as the delay time for transmitting the signal to the external echo canceller unit and for receiving the processed signal back from the external echo canceller unit is eliminated. Hand-off training noise is also eliminated.

Although several embodiments of the present invention and its advantages have been described in detail, it should be understood that changes, substitutions, transformations, modifications, variations, and alterations may be made therein without departing from the teachings of the present invention, the spirit and the scope of the invention being set forth by the appended claims.

What is claimed is:

1. An apparatus for echo cancellation comprising:

an echo canceller module; and a controller coupled to the echo canceller module to change the operational state of the echo canceller module, the controller being configured to not enable the echo canceller module with respect to a given call when signaling data associated with the call indicates that the call is transmitted through a hybrid.

2. The system of claim 1 further comprising a call processing system coupled to the echo canceller module controller, wherein the call processing system is operable to receive the signaling data and to analyze the signaling data to assess whether the call associated with the signaling data is directed to a radio based subscriber unit.

3. The system of claim 1 further comprising:

a call processing system;

an in-band signaling agent coupled to the call processing system and the echo canceller module controller; and wherein the call processing system is operable to receive signaling data that includes the call party data and to transfer the call party data to the in-band signaling agent.

4. The system of claim 3 wherein the in-band signaling agent is an R2 signaling agent.

5. The system of claim 1 further comprising:

a call processing system;

an out-of-band signaling agent coupled to the call processing system and the echo canceller module controller; and wherein the call processing system is operable to receive signaling data that includes the call party data and to transfer the call party data to the out-of-band signaling agent.

6. The system of claim 5 wherein the out-of-band signaling agent is an integrated services digital network user part agent.

7. The system of claim 1 further comprising:

a call processing system;

an in-band signaling agent coupled to the call processing system;

an out-of-band signaling agent coupled to the call processing system;

an agent interworking system coupled to the in-band signaling agent, the out-of-band signaling agent, and the echo canceller module controller; and wherein the call processing system is operable to receive signaling data that includes the call party data and to transfer the call party data to the echo canceller module controller using the in-band signaling agent, the out-of-band signaling agent, and the agent interworking system.

8. A method for processing telecommunications comprising:

receiving an incoming telecommunications channel at a telecommunications switch;

receiving signaling data at the telecommunications switch;

determining whether the incoming telecommunications channel requires echo cancellation from the ignaling data; and turning an echo canceller module on if the incoming telecommunications channel requires echo cancellation.

9. The method of claim 8 wherein determining whether the incoming telecommunications channel requires echo cancellation comprises determining whether the incoming telecommunications channel originated from a land-based terminal or from a mobile terminal.

10. The method of claim 8 wherein receiving signaling data at the telecommunications switch comprises:

receiving an incoming telecommunications channel of in-band signaling data; and extracting call origination data from the in-band signaling data.

11. The method of claim 10 wherein the in-band signaling data is R2 signaling data.

12. The method of claim 8 wherein receiving signaling data at the telecommunications switch comprises:

out-of-band signaling data; and extracting call origination data from the out-of-band signaling data.

13. The method of claim 12 wherein the out-of-band signaling data is integrated services digital network user part data.

14. The method of claim 9 wherein determining whether the incoming telecommunications channel originated from a land-based terminal or from a mobile terminal comprises comparing extracted in-band signaling data from the incoming telecommunications channel to a predetermined value that correlates to a land-based terminal.

15. The method of claim 9 wherein determining whether the incoming telecommunications channel originated from a land-based terminal or from a mobile terminal comprises comparing extracted R2 signaling data from the incoming telecommunications channel to a predetermined value that correlates to a land-based terminal.

16. The method of claim 9 wherein determining whether the incoming telecommunications channel originated from a land-based terminal or from a mobile terminal comprises comparing extracted integrated services user part signaling data from the incoming telecommunications channel to a predetermined value that correlates to a land-based terminal.

17. A method for controlling echo cancellation comprising:

intiating an outgoing telecommunications channel at a telecommunications switch;

determining whether the destination of the outgoing telecommunications channel is a land-based terminal; and turning on an echo canceller module if the destination of the outgoing telecommunications channel is a land-based terminal.

18. The method of claim 17 wherein initiating an outgoing telecommunications channel at a telecommunications switch comprises:

collecting signaling data from a subscriber unit;

determining that the signaling data is signaling data for an outgoing telecommunications channel; and transmitting the signaling data to a call processor system.

19. The method of claim 17 wherein determining whether the destination of the outgoing call is a land-based terminal or a mobile terminal comprises:

encoding the signaling data into an in-band signaling data format;

transmitting the signaling data over an in-band signaling data channel;

receiving response data from the in-band signaling data channel; and comparing extracted in-band signaling data from the response data to a predetermined value that correlates to a land-based terminal.

20. The method of claim 17 wherein determining whether the destination of the outgoing call is a land-based terminal or a mobile terminal comprises:

encoding the signaling data into an in-band signaling data format;

transmitting the signaling data over an in-band signaling data channel;

receiving response data from the in-band signaling data channel; and comparing extracted R2 signaling data from the response data to a predetermined value that correlates to a land-based terminal.

21. The method of claim 17 wherein determining whether the destination of the outgoing call is a land-based terminal or a mobile terminal comprises:

encoding the signaling data into an out-of-band signaling data format;

transmitting the signaling data over an out-of-band signaling data channel;

receiving response data from the out-of-band signaling data channel; and comparing extracted out-of-band signaling data from the response data to a predetermined value that correlates to a land-based terminal.

22. A method for processing roaming telecommunications channels comprising:

receiving roam data for a telecommunications channel at a telecommunications switch;

transferring echo cancellation processing for the telecommunications channel to an anchor echo cancellation module; and performing echo cancellation processing for the telecommunications channel with the anchor echo cancellation unit until a state of call completion is reached.

23. The method of claim 22 wherein receiving roam data for a telecommunications channel at a telecommunications switch comprises:

establishing a telecommunications channel to a mobile subscriber unit with a telecommunications switch;

assigning the telecommunications channel to an echo cancellation module for echo cancellation processing; and receiving signaling data at the telecommunications switch that indicates that the mobile subscriber unit is moving from a first service cell to a second service cell.

24. The method of claim 22 wherein transferring echo cancellation processing for the telecommunications channel to an anchor echo cancellation module comprises transferring echo cancellation processing to a bank of anchor echo cancellation modules.

25. The method of claim 22 wherein transferring echo cancellation processing for the telecommunications channel to an anchor echo cancellation module comprises changing the status of an echo cancellation module that is performing echo cancellation processing for the telecommunications channel to anchor echo cancellation module status.

* * * * *